Patented Mar. 11, 1952

2,589,108

UNITED STATES PATENT OFFICE 2,589,108

CHLORINATED LIME COMPOSITION

Jacob G. Mark, Brookline, Mass., assignor, by mesne assignments, to the United States of America as represented by the Secretary of War No Drawing. Application August 2, 1943, Serial No. 497,091

5 Claims. (Cl. 252—99)

The invention described herein may be manufactured and used by or for the Government for governmental purposes without the payment to me of any royalty thereon.

This invention relates generally to free flowing, non-caking chloride of lime, adapted to readily yield a smooth, dispersed slurry in water.

In a commercial preparation of chlorinated lime, also known in the art as chloride of lime and bleach, by passing chlorine through slaked lime, water is released and cannot be conveniently removed. Commercial chlorinated limes usually contain about 10% of water even when freshly made. They are not free flowing powders and often, unless the limes are stored in special airtight containers, form a solid lump in storage.

A further difficulty encountered in connection with commercial chlorinated lime, is that even when the caked lime is broken into relatively small particles, it does not readily form water slurries, for it is not easily or quickly wet by water. Whatever small lumps are originally present persist and settle out. If the slurry must be sprayed, straining out of the lumps is necessary and, in any case, the spreading power and chemical efficiency of the slurries is not nearly as great as is theoretically possible.

These defects of chlorinated lime are particularly objectionable in connection with the use of that product for the decontamination of chemical warfare vesicant agents, such as mustard gas and nitrogen mustard. It is necessary that the chloride of lime be kept as a free flow-powder so that time will not be lost in breaking up large cakes thereof. Furthermore, it is desirable that the chlorinated lime be readily wet and dispersed in water so that a slurry may be quickly formed thereof. Heretofore, no free flowing chloride of lime has been available which would retain its free flowing properties during storage, and would readily form water slurries.

Accordingly, the object of this invention, generally stated, is the provision of a chlorinated lime composition which can be stored in ordinary containers without losing its free flowing properties, and which will go into suspension with water much more rapidly than do the present limes.

Other objects of the invention, will, in part be obvious, and will in part appear hereinafter.

It would be expected that almost any powder inert both to chlorine and oxygen, when added to chlorinated lime, would act as a flowing agent. However, this is not the case, and for some unexplainable reason the chlorinated lime is extremely erratic in this respect. This product has been found to be selective not only as to the flowing agent, but also as to the particular particle size of the flowing agent. A flowing agent which is effective in a certain particle size, may be ineffective, or even objectionable in another particle size. For example one of the most effective materials for preventing the lumping or caking of chlorinated lime in containers was found to be a channel gas black with a surface area of 100 sq. meters per gram and a calculated particle diameter of 0.030 microns, but this material causes the lime to release chlorine and, therefore, is impractical. Carbon black of 700 sq. meters per gram surface area produced no increase in flowability, but did release chlorine at a dangerous rate. When carbon black having a surface area of approximately 64 sq. meters per gram was used, not only was chlorine released but no improvement in flowability was noted.

The surface area of the flowing agent alone does not explain this phenomenon. A satisfactory material was found to be ordinary commercial dry silica gel with a particle size of 4 to 6 microns, about 200 times as large as the particle size of the carbon black which did increase the flowability. With such wide variations in performance empirical study alone is possible. A large number of materials were added to chloride of lime. Of the materials tested, only dried silica gel gave a significant improvement in flowability and, at the same time, maintained the quantity of available chlorine properly throughout the storage period.

I presently prefer to use silica gel of micron dimensions as the flowing agent. One percent of this material by weight added to the chloride of lime shows no improvement in flowability when freshly mixed, but, if the mixture is allowed to stand in air for about twenty-four hours, a definite improvement in flowability develops. It is assumed that this effect is due to the absorption of water by the silica gel, but since a small proportion of chlorine is lost by exposure to air, it is better to increase the initial proportion of flowing agent. A 5% addition of dry silica gel having a particle size of 4 to 6 microns will produce an immediate and permanent improvement in flowability. There is no strict upper limit of the amount of addition except that good judgment dictates that the bulk efficiency of the compound should be kept as high as possible. The increase in flowability which is gained by additions greater than 5% is small enough to be disregarded in the interest of bulk efficiency.

Although such a chlorinated lime is free flowing and is useful when the lime is to be used in powder form, it does not form water slurries quickly but by adding both a dispersing agent and a wetting agent, for example, the sodium salt of a formaldehyde condensation product of a sulphonic acid and the sodium salt of an alkylated sulphonic acid, a compound is produced which wets and disperses easily in water.

*Example I*

| | Per cent |
|---|---|
| Chlorinated lime (commercial) | 95 |
| Silica gel (particle size 4 to 6 microns) | 5 |
| Total | 100 |

The two powdered materials are placed in a tumble type mixing apparatus and mixed dry until a uniform mixture is produced. This example produces a stable, noncaking powder.

*Example II*

| | Per cent |
|---|---|
| Chlorinated lime (commercial) | 89 |
| Silica gel (particle size 4 to 6 microns) | 5 |
| Sodium salt of a formaldehyde condensation product of betanaphthalene sulphonic acid | 5 |
| Sodium salt of isopropyl naphthalene sulphonic acid | 1 |
| Total | 100 |

The material is added to a tumble type mixer as dry powders and mixed until a uniform distribution of all ingredients is secured. The product of Example II wets readily, goes into suspension quickly and contains few lumps, may be dumped out of the can into water, stirred and an effective decontamination slurry made almost immediately.

It will be realized from the nature of the invention that certain substitutions and modifications will be apparent to those skilled in the art without departing from the scope of my invention. Accordingly, it is intended that all matter described and set forth hereinbefore shall be interpreted as illustrative and not in a limiting sense.

I claim as my invention:

1. A free flowing, noncaking composition consisting essentially of chloride of lime and about 5% by weight of dry silica gel having a particle size of between 4 and 6 microns.

2. A free flowing, noncaking composition yielding smooth, dispersed slurries in water consisting essentially of chloride of lime, and also including, about 5% by weight of dry silica gel having a particle size of between 4 and 6 microns, a sufficient amount of a water soluble salt of a formaldehyde condensation product of a sulphonic acid to act as a dispersing agent, and a sufficient amount of a water soluble salt of an alkylated sulphonic acid to act as a wetting agent.

3. A free flowing, noncaking composition yielding smooth, dispersed slurries in water comprising, by weight, about 89% of chlorinated lime, about 5% of dry silica gel having a particle size of from 4 to 6 microns, about 5% of the sodium salt of a formaldehyde condensation product of betanaphthalene sulphonic acid, and about 1% of the sodium salt of isopropyl naphthalene sulphonic acid.

4. A free flowing non-caking composition consisting essentially of chloride of lime and dry finely divided silica gel having a particle size of from 4 to 6 microns; said silica gel consisting of between 1% and 5% by weight of the composition.

5. A free flowing, non-caking, composition yielding smooth dispersed slurries in water consisting essentially of chloride of lime, and including, by weight, from 1 to 5% of dry finely divided silica gel having a particle size of between 4 and 6 microns; about 5% of a water soluble salt of a formaldehyde condensation product of a sulphonic acid as a dispersing agent, and about 1% of a water soluble salt of an alkylated sulphonic acid as a wetting agent.

JACOB G. MARK.

REFERENCES CITED

The following references are of record in the file of this patent:

UNITED STATES PATENTS

| Number | Name | Date |
|---|---|---|
| 1,916,770 | Reitz et al. | July 4, 1933 |
| 1,967,393 | Calcott et al. | July 24, 1934 |
| 2,056,924 | Kalber | Oct. 6, 1936 |
| 2,060,210 | Heckert | Nov. 10, 1936 |
| 2,213,693 | Davies et al. | Sept. 3, 1940 |
| 2,257,545 | Curtis | Sept. 30, 1941 |
| 2,320,280 | Kalusdian | May 25, 1943 |